United States Patent

[11] 3,557,685

| [72] | Inventor | John B. Schroering |
| | | Louisville, Ky. |
| [21] | Appl. No. | 787,116 |
| [22] | Filed | Dec. 26, 1968 |
| [45] | Patented | Jan. 26, 1971 |
| [73] | Assignee | Industrial Services of America Inc. |
| | | Louisville, Ky. |
| | | a corporation of Kentucky |

[54] SOLID WASTE DISPOSAL PLANT
1 Claim, 2 Drawing Figs.

[52] U.S. Cl.................................................. 100/39,
100/70, 100/91, 100/97; 209/125; 241/24, 241/68
[51] Int. Cl........................................................ B30b 13/00
[50] Field of Search........................................... 209/122,
124, 125; 241/24, 68, 75; 100/35, 39, 90, 91, 70, 194, 95, 96, 97

[56] References Cited
UNITED STATES PATENTS

| 906,321 | 12/1908 | Sperry.......................... | 100/35X |
| 1,142,706 | 6/1915 | Hidoux.......................... | 241/24X |
| 2,059,229 | 11/1936 | Gregg........................... | 100/39 |
| 2,954,173 | 9/1960 | Dunwody....................... | 241/24 |
| 3,013,675 | 12/1961 | Schonrock..................... | 100/229UX |
| 3,212,432 | 10/1965 | Raab............................. | 100/90X |
| 3,283,698 | 11/1966 | Williams........................ | 100/97 |
| 3,330,088 | 7/1967 | Dunlea.......................... | 100/97UX |
| 3,446,026 | 5/1969 | Fikse............................. | 100/95X |

OTHER REFERENCES
" REFUSE DISPOSAL BY TRI-PAK" (Pages 1— 3) Oct. 23, 1968

*Primary Examiner*—Billy J. Wilhite
*Attorney*—Woodard, Weikart, Emhardt and Naughton

ABSTRACT: This application discloses a plant for practicing a process for disposing of solid waste material by initially moving raw waste into a salvage separation area, then separating salvageable material from the waste material to be further processed, subsequently shredding the residue waste material and compacting or bailing it, and finally transporting the shredded and compacted waste to a sanitary landfill.

PATENTED JAN 26 1971　　　　　　　　　　　　　　　3,557,685

INVENTOR
JOHN B. SCHROERING
BY Woodard, Weikart, Emhardt & Naughton
Attorneys

SOLID WASTE DISPOSAL PLANT

BACKGROUND OF THE INVENTION

Modernly, the waste products of our industrial society have increased at a rate far more rapid than population growth. Warnings that our communities are sinking under a mountain of waste material, disposed of either not at all or improperly, have become cliches. Although some effort has been made, in the recent past, to use materials for packaging which will disintegrate under normal, environmental conditions at the end of some limited time period subsequent to their use, this solution, for the foreseeable future, will obviously not be a major factor in solving the problem. Incineration, another traditional answer to the problem, is so expensive per unit of capacity, and the air pollution problems generated by even the most modern incinerating plants are so troublesome that it is now generally recognized that solutions to the problem do not lie in this direction.

The sanitary landfill disposal method is extensively used, however, as presently invisioned, this process also presents difficulties. The quantity of available land near industries and housing communities suitable for sanitary fill operation is decreasing rapidly.

The process of the present invention results in shredding of waste material, from which salvageable components have been removed and subsequently compacted into high density bales and sold. Savings in subsequent transport of the remaining processed waste material to the landfill site, because of the low bulk, high density character of the processed material are substantial, and when the processed waste material is, when placed in the landfill, it is more homogenous than is the case with unprocessed waste material, and the site, after filling, becomes sufficiently dense to accommodate residential or other construction in a relatively short time. Conventionally, landfill sites require either local compaction or long settling periods before they acquire the density required to support construction such as home building. Since the processed waste material has been shredded and compacted, a given landfill site will accommodate a greater volume of waste material and the useful life of the site is substantially increased

DESCRIPTION OF THE PREFERRED EMBODIMENT

Figure 1:
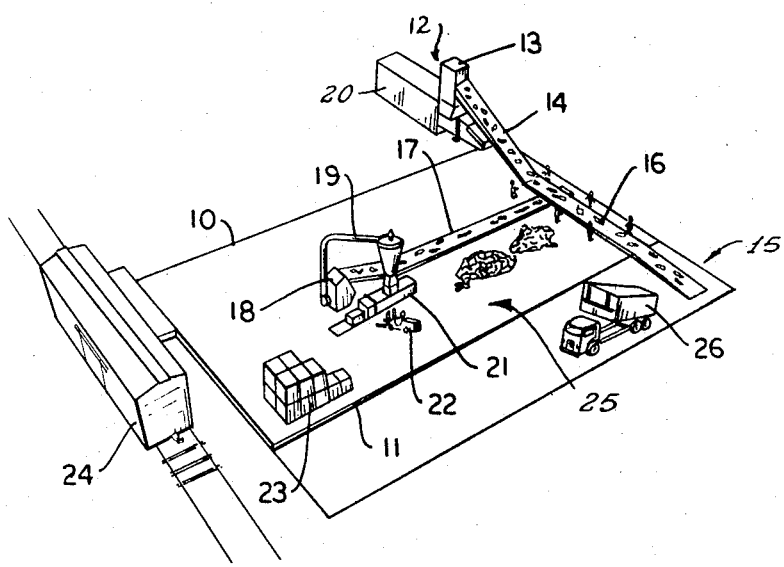
FIG. 1 is a perspective view of the apparatus with which the process of the present invention may be carried out.
Figure 2:
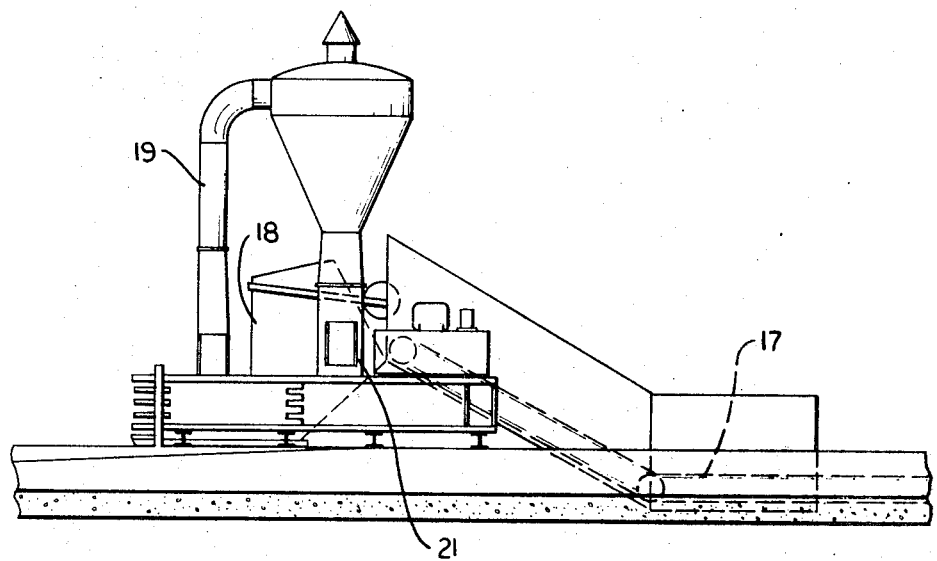
FIG. 2 is a side view of a portion of the apparatus shown in FIG. 1.

Referring to the drawings, the physical layout of the apparatus preferably takes the form shown in FIG. 1 with the area between the lines 10 and 11 roofed by a suitable structure. Waste material from industrial plants or the like is introduced from containers 26 into the process at the area generally indicated by reference numeral 15 in FIG. 1. As indicated in FIG. 1, workmen may be stationed adjacent the horizontal portion 16 of the conveyor for inspecting and removing any salvageable metal items or those which are to be segregated from the material passing to further processing or the conveyor 17. The remaining, nonsalvageable refuse material then is conveyed up and through a conventional hammermill 13, as manufactured by Hammermills, Inc. of Cedar Rapids, Iowa, identified by the manufacturer as Model No. 680. The output from the hammermill 13 is discharged into a stationery compactor 12 which in turn compacts the shredded waste into removable compaction container 20. When the compaction container 20 is filled to capacity, it is detached and taken to the ultimate disposal site.

The conveyor 17 passes beneath the conveyor portion 16 and the salvaged cardboard or paper material dropped on it moves into a conventional shredder identified at 18. The shredder may be of a convention type manufactures by Williams Company of st. Louis, Missouri and identified as their 600 series. The output of the shredder 18 is air-conveyed through the conduit 19 to a baler 21 which may take the form of the baler structure disclosed in U.S. Pat. No. 2,646,475. The compacted baled material coming from the baler 21 may be transported by a forklift truck (indicated at 22 in FIG. 1) and stacked as indicated at 23 for subsequent transport from the storage point 23 into a truck trailer or freight car 24 for transport to the customer. Salvaged metallic materials which are taken off the conveyor at 16 may be placed into open containers at 25 for processing and sale to customers.

I claim:

1. A process of disposal of solid waste material comprising: initially moving raw waste material by means of a manually accessible conveyor into a salvage-separating area, manually separating salvageable material from the nonsalvageable material by depositing the nonsalvageable material upon a second conveyor, through a shredding and compacting apparatus, and subsequently transporting the shredded and compacted material to a sanitary landfill.